United States Patent
Fenioux et al.

[19]

[11] Patent Number: 5,916,025
[45] Date of Patent: Jun. 29, 1999

[54] FLYWHEEL, FOR MOTOR VEHICLES

[75] Inventors: Daniel Fenioux, Eminay; Jacques Feigler, Saint-Brice-Sous-Foret, both of France

[73] Assignee: Valeo, Paris, France

[21] Appl. No.: 08/702,672

[22] PCT Filed: Jan. 11, 1996

[86] PCT No.: PCT/FR96/00043

§ 371 Date: Dec. 4, 1996

§ 102(e) Date: Dec. 4, 1996

[87] PCT Pub. No.: WO96/21811

PCT Pub. Date: Jul. 18, 1996

[30] Foreign Application Priority Data

Jan. 11, 1995 [FR] France ................................. 9500391
Mar. 30, 1995 [FR] France ................................. 9504001

[51] Int. Cl.⁶ .................................................. F16D 3/14
[52] U.S. Cl. .......................... 464/67; 464/68; 192/213.3; 192/214
[58] Field of Search ................................ 464/66, 24, 67, 464/68; 192/213.3, 213.31, 214.1, 214

[56] References Cited

U.S. PATENT DOCUMENTS

| | | | |
|---|---|---|---|
| 4,782,933 | 11/1988 | Jackel et al. | 192/213.22 |
| 4,856,636 | 8/1989 | Meinhard | 464/68 |
| 4,876,917 | 10/1989 | Aiki et al. | 464/68 |
| 5,120,276 | 6/1992 | Maucher et al. | 464/68 |
| 5,123,877 | 6/1992 | Maucher et al. | 464/68 |
| 5,146,811 | 9/1992 | Jackel | 464/66 |
| 5,194,046 | 3/1993 | Jackel | 464/68 |
| 5,269,725 | 12/1993 | Maucher et al. | 464/68 |
| 5,307,710 | 5/1994 | Feldhaus et al. | 464/68 |
| 5,493,936 | 2/1996 | Stockmann et al. | 464/66 |

FOREIGN PATENT DOCUMENTS

| | | |
|---|---|---|
| 0 173 838 | 3/1986 | European Pat. Off. . |
| 1 598 557 | 8/1970 | France . |
| 2 664 340 | 1/1992 | France . |
| 2 687 442 | 8/1993 | France . |
| 2695579 | 3/1994 | France . |
| 2 700 192 | 7/1994 | France . |
| 38 15 505 | 12/1988 | Germany . |
| 2 231 937 | 11/1990 | United Kingdom . |

*Primary Examiner*—Eileen Dunn Lillis
*Attorney, Agent, or Firm*—Longacre & White

[57] ABSTRACT

A flywheel having to coaxial members, the first member designed to be rotational integral with a drive shaft such as the crankshaft of an internal combustion engine, the second member designed to be connected with a driven shaft such as a gear box. The coaxial members are mounted via a bearing and coupled to each other. The second member forms a reaction plate of a friction clutch having ventilation holes proximate the bearing. The ventilation holes open into the bottom of a groove provided in the second member around the inner edge of the reaction plate radially above the bearing for collecting lubricating agent such as oil escaping from the center of the flywheel.

5 Claims, 2 Drawing Sheets

FLYWHEEL, FOR MOTOR VEHICLES

BACKGROUND OF THE INVENTION

1. Field of the Invention

The present invention relates to damped flywheels, especially for motor vehicles, of the kind comprising two coaxial masses, one of which, referred to as the first mass, is adapted to be coupled in rotation to a driving shaft, such as the crankshaft of an internal combustion engine, the other one, referred to as the second mass, being adapted to be connected to a driven shaft, such as the input shaft of a gearbox, and of the type in which the two masses are mounted coaxially through an interposed bearing, such as a ball bearing, and in which coupling means are interposed between the two masses so as to couple the second mass to the first mass.

The coupling means may comprise springs acting either circumferentially or radially, or in another version these means may be of a centrifugal type as described in the document FR-A-1 598 557.

In all cases, the second mass constitutes the reaction plate of a friction clutch, and for this purpose it offers a friction surface to the friction disc which is part of the said clutch. Thus the second mass is arranged to be mounted in rotation on a driven shaft through the interposed friction disc, that is to say in a disconnectable manner.

The friction liners of the friction disc tend to become heated in service, and the same is then true for the second mass which defines the reaction plate.

Under severe driving conditions, this second mass may reach very high temperatures, and this is why, in the document FR-A-1 598 557, ventilation holes were provided in the second mass, between the bearing and the friction surface of the second mass, in order to reduce the temperature in the region of the bearing. These holes thus prevent any risk of over-heating of the bearing. They are located close to the bearing.

SUMMARY OF THE INVENTION

An object of the present invention is to make use of these ventilation holes for an additional purpose.

In accordance with the invention, the ventilation holes are open into the base of a groove which is formed in the second mass at the inner periphery of its reaction plate radially outwardly of the bearing, for collecting a lubricating agent such as oil escaping from the centre of the damped flywheel, and the edge of the base of the groove is interrupted by the ventilation holes.

This oil may be oil that has leaked from the crankshaft of the vehicle or from the gearbox of the latter. In another case there may be grease which has escaped from the bearing. The same groove thus prevents contamination of the friction surface of the reaction plate and of the friction liners of the friction disc.

Thus, the ventilation holes have a double function, namely a ventilating function and a function of evacuating leaked oil and/or grease, which collects in the bottom of the collecting groove. Thus, the lubricating agent (i.e. oil, grease, etc.) will be evacuated, together with any contaminants, in a wholly effective way because the holes are open into the base of the groove.

The holes, which extend from one side of the second mass to the other, may be of round form or of circumferentially oblong form. They may be flared towards the first mass, or vice versa.

The following description illustrates the invention with reference to the attached drawings, in which:

DETAILED DESCRIPTION OF THE PREFERRED EMBODIMENT

Figure 1:
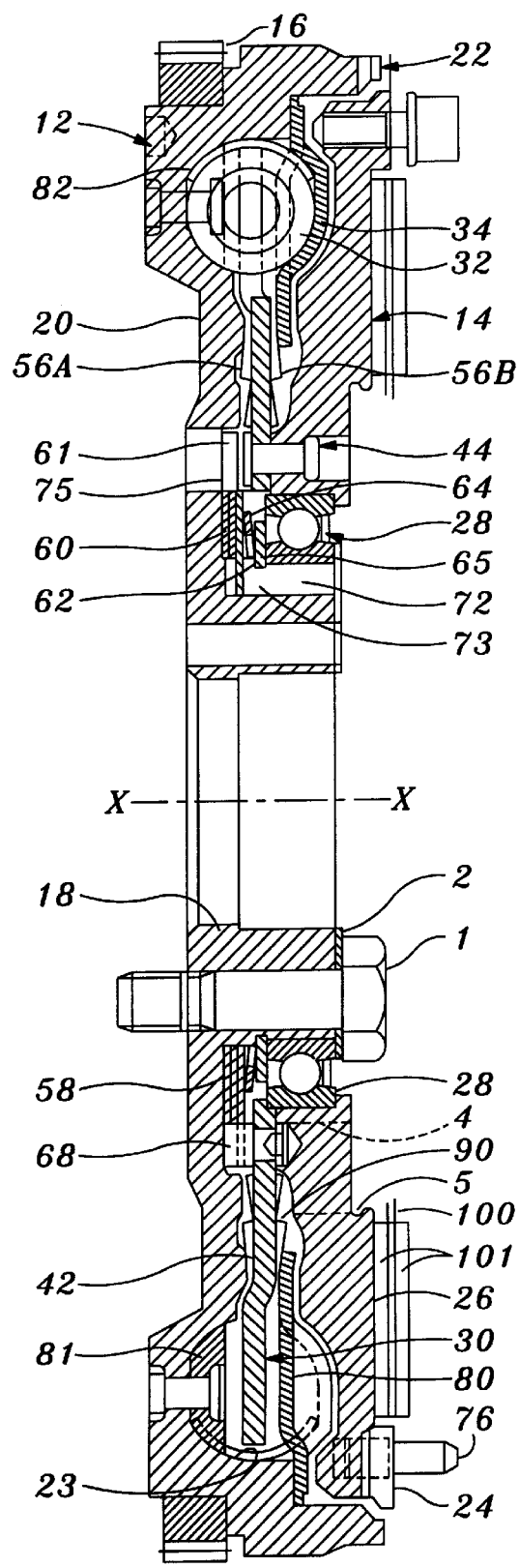
FIG. 1 is a view in axial cross section taken on the line 1—1 in FIG. 2, of a damped flywheel in accordance with the invention.
Figure 3:
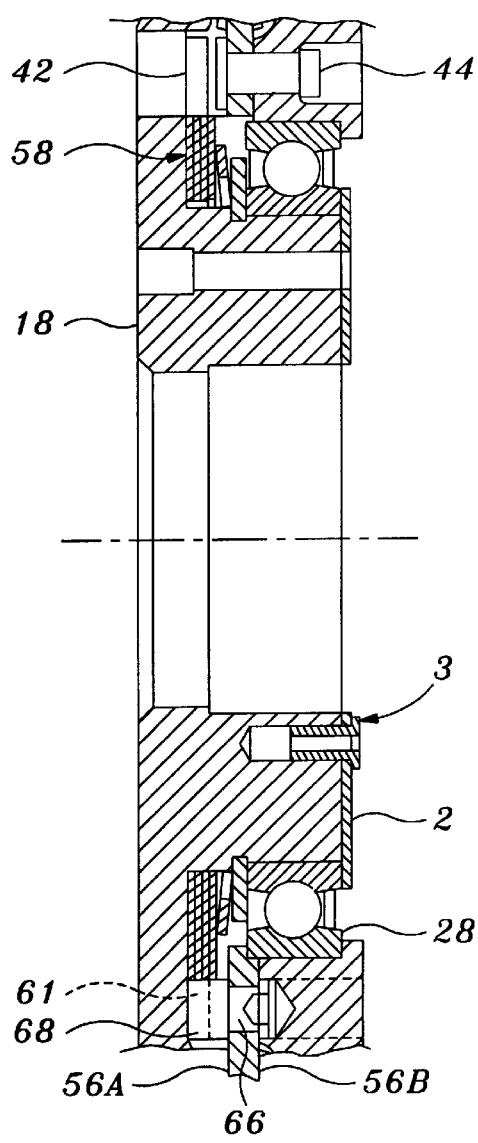
FIG. 3 is a partial view, seen in cross section taken on the line 3—3 in FIG. 2.
Figure 2:
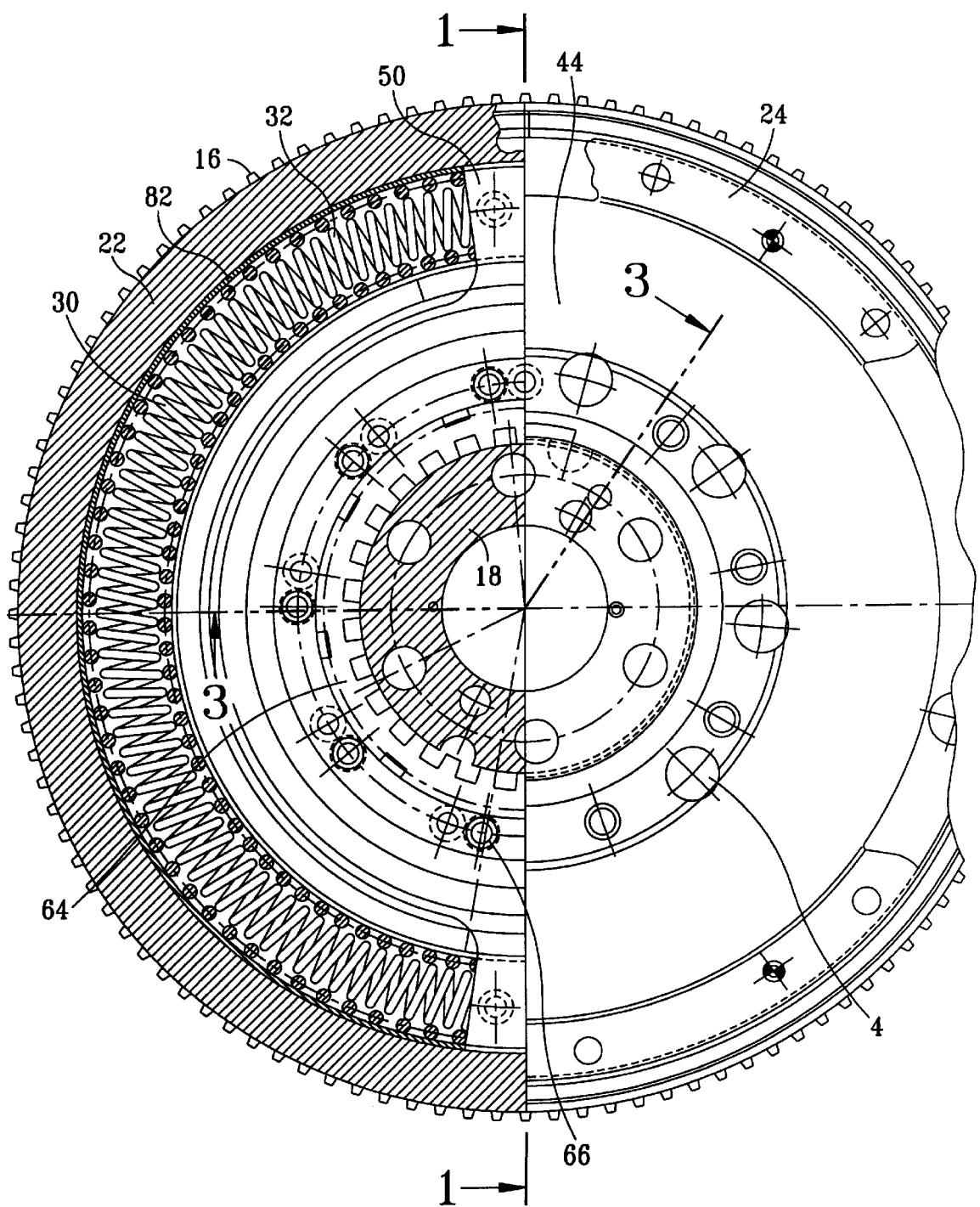
FIG. 2 is a view in the direction of the arrow 2 in FIG. 1, and partly in cross section.

FIGS. 1 to 3 show a damped flywheel for a motor vehicle, consisting essentially of a first mass (or first rotary element) 12 and a second mass (or second rotary element) 14, which are mounted for movement of one with respect to the other about an axial axis of symmetry X—X of the assembly.

In this example the masses 12 and 14 are mounted coaxially through an interposed bearing 28, to be described later herein, and are arranged for movement of one with respect to the other against the action of circumferentially acting resilient means 32 and the action of an axially acting friction device 58.

The first mass 12, which in this example is in the form of a plate, carries a starter crown 16 which is adapted to cooperate with the starter (not shown) of the vehicle. This plate has at its inner periphery an integral central hub 18, while at its outer periphery it has an axially oriented annular peripheral skirt 22.

The plate 20, which is integral with its skirt 22 and its hub 18, is made of a mouldable material, being in this example a casting.

The first mass 12 is adapted to be secured accordingly on the end of the crankshaft of the internal combustion engine, in a manner to be described later herein.

The first mass 12 is thus arranged to be mounted on a driving shaft for rotation with the latter, to which it is fixed in this example by means of studs 1.

The second mass 14 is also made of a mouldable material, being a casting in this example, and comprises a reaction plate 26 having at its outer periphery an axially oriented cylindrical skirt 24, which is of divided form in this example, and which is surrounded by the skirt 22 of the first mass 12.

The second mass 14 is mounted on the hub 18 of the first mass 12, in this example through an interposed ball bearing 28, though in another version this may be another bearing, for example a bearing of the plain type.

The first mass 12 delimits at its outer periphery the greater part of an annular housing (or chamber) 30, which is arranged to receive the circumferentially acting resilient means 32, which in this example consist of a set of helical springs arranged in the form of a crown and being, in this example, concentric with each other.

In the present example there are two sets of concentric springs 32. This number does of course depend on the application.

The housing 30 is mostly delimited, in the present case, by the plate 20, the skirt 22 and a disc 34 which is part of the first mass.

The chamber 30 leaves open at its inner periphery a narrow slot into which there penetrates a disc 42 which is part of the second mass, this penetration being sealed in a manner to be described below.

The disc 34, which is of metal in this example, extends inwardly from the skirt 22 between the two plates 20, 26, and is directed inwardly in the radial direction.

The disc 34 is coupled to the external skirt 22, for rotation with the latter, by being seamed sealingly to it in the manner described in the document FR-A-2 695 579. To this end, the skirt 22 is shouldered, and its shoulder has a groove which is arranged to receive the metal of the metallic disc during the process of seaming the latter in place.

In another version, this sealed fastening may be achieved by screw fastening, in the manner described in the document FR-A-2 687 442.

In a further version, riveting or welding may be used. The said disc 34 constitutes a cover member for the plate 20, the latter being hollow and being bounded by its skirt 22 and its hub 18.

The plate 26 is recessed in order to accommodate the disc 34, which has local pressed-out portions 80 (FIG. 1) for abutment of the circumferential ends of the helical springs 32 thereon.

In facing relationship with these pressed-out portions 80, the plate 20 has thrust inserts 81, which are secured by riveting on the plate, for abutment of the circumferential ends of the said springs thereon.

The disc 34 and the plate 20 define an annular passage containing the springs 32. To this end, the plate 20 has an annular recess at its outer periphery, and the disc 34 is bowed, in order to retain the springs both axially and radially.

The skirt 22 is recessed internally so as to retain the springs 32 radially.

For this purpose, the internal bore has an annular surface portion 23. The plate 20, the skirt 22 and the disc 34 thus hug the profile of the springs 32, and in this example the profile of the outermost springs.

The second mass 14 further includes the disc 42, which is referred to as the inner disc and which is coupled to the second mass 14 for rotation with it, by means of rivets 44, the disc 42 extending radially from the inner periphery of the plate 26 to the annular housing or chamber 30. This chamber 30 is filled partially with, in this example, a pasty or viscous agent for lubricating the springs 32.

In a manner known per se, the plate 26 constitutes the reaction plate of a clutch.

The second mass 14 is thus arranged to be mounted in rotation on a driven shaft, which in this example is the input shaft of the gearbox, through the interposed friction disc 100 of the clutch (which is shown diagrammatically), the friction liners 101 of which are adapted to be clamped between the reaction plate 26 and a pressure plate (not shown) forming part of the mechanism of the clutch, the mechanism being adapted to be attached through its cover plate, by means of screws, one of which can be seen in the upper part of FIG. 1, on the reaction plate 26, which offers on the side opposite to the plate 20 a friction surface for the above mentioned friction disc 100.

The outer edge of the inner disc 42 includes radial lugs 50, and in this example two lugs which are generally diametrically opposed to each other, and which are arranged to serve as end abutments for the circumferential ends of the springs 32.

Thus, the disc 42 penetrates into the housing 30, while the springs 32, bearing on the thrust inserts 81 and the pressed-out portions 80 of the disc 34, are able to be compressed by the lugs 50.

In this example, antiwear pieces 82, which are here of channel section, are interposed radially between the springs 32 and the inner periphery of the skirt 22.

More precisely, these channel pieces 82, the cross section of which is that of an arc of a circle, are received in the annular surface portions 23. The channel pieces 82 extend generally over 90 degrees in this example, hugging the profile of the surface portions 23, which consist here of one surface portion 23 divided by the thrust inserts 81.

The springs 32 are thus adapted so as to be put into contact, under the action of centrifugal force, with the channel pieces 82, which in this example are of steel.

There is a small gap between the plate 20 and the inner periphery of the disc 34, into which the disc 42 penetrates.

Internal sealing of the annular housing is provided by means of two sealing rings 56A, 56B. These rings 56A, 56B consist of two annular members of stamped and press-formed sheet material. They are elastic.

The rings 56A, 56B close off the housing 30 at its inner periphery, the said housing being filled partly with a pasty or viscous agent for lubrication of the springs 32, in a manner to be described later herein.

More precisely, the outer flange of the ring 56A is in elastic engagement against an engagement surface which is formed in facing relationship with it in the plate 20 of the first mass 12, while the outer radial edge of the second sealing ring 56B is in elastic contact against an engagement surface which is formed, in facing relationship with it, in the inner periphery of the disc 34 of the first mass 12.

The rings 56A and 56B are disposed on either side of the disc 42, to which they are attached.

The damped flywheel further includes a friction device 58 which works axially between the two masses.

This device 58 surrounds the hub 18 and includes a friction ring 60, which in this example is of fibre-reinforced plastics material, and which is adapted to engage frictionally on a flat surface portion of the plate 20, together with a ring 62 which in this example is of metal, and which is driven in rotation by the hub 18.

An axially acting resilient ring 64 biasses the ring 62 resiliently into engagement against the ring 60.

The ring 64, which in this example is of the Belleville ring type, but which in another version may be a ring of the corrugated type, bears on a thrust ring 65 which is located axially on the inner ring of the ball bearing 28, the latter being force-fitted on the hub 18.

The hub 18 is formed with holes for the passage through the holes of the studs 1 by which the damped flywheel is fastened on the crankshaft of the engine.

One of these studs 1 can be seen in the central part of FIG. 1.

The studs 1 bear, through their heads, on a ring 2 which locates the inner ring of the ball bearing 28 axially in one direction.

In the other direction, the inner ring is located axially by means of the above mentioned thrust ring 65, which may consist of a circlip engaged in a groove of the hub 18.

The damped flywheel is thus mounted between two rotating assemblies, one of which (i.e. the crankshaft) is coupled to the internal combustion engine of the vehicle, the other one being coupled (in a disconnectable way) to the input shaft of the gearbox.

The ring 60 has at its outer periphery a crown element formed with notches 61. These notches, or slots, 61 are arranged to cooperate with the heads 68 of a set of rivets 66, which are fixed on the internal annular disc 42 of the second mass 14.

As can be seen in FIG. 2, the inner radial edge of the sealing ring 56A is gripped between the head 68 of each rivet 66 and the flat surface portion of the disc 42, the latter being of metal.

Thus the first sealing ring 56A is fixed on the disc 42, and its internal radial flange has for this purpose a set of holes through which the bodies of the rivets 66 are passed.

This arrangement, apart from enabling the ring 60 to be driven in rotation by cooperation of the heads 68 with the edge of the associated slots 61 of the ring 60, also fastens the sealing ring 56A on the disc 42.

This arrangement enables the sealing ring 56A to be mounted and fastened on the disc 42 before the said disc 42 is fixed on to the plate 26 of the second mass 14 by means of a set of fastening rivets 44.

These rivets 44, which are fitted at the inner periphery of the plate 26, as are the rivets 66, fasten the disc 42 only, without fastening the sealing rings 56A, 56B, these latter thus being protected.

The second sealing ring 56B is preferably fixed in the same way as the sealing ring 56A, by means of the fastening members 66.

Thus, the inner radial end of the sealing ring 56B is gripped between the foot of each rivet 66 and the portion of the disc 42 in facing relationship with it.

The inner radial end is formed with holes, through which the bodies of the rivets 66 pass.

Thus, the radial edges of the rings 56A, 56B lie in contact with the disc 42 and on either side of the latter, the whole constituting an assembly which can readily be handled and transported, and which cannot be lost.

As can be seen in FIG. 2, the fastening rivets 66 and the coupling rivets 44 are preferably arranged substantially on a common pitch circle, being spaced apart alternately at regular intervals along this circle.

The second mass 14 has recesses facing the feet of the rivets 66, so as to enable the said feet to pass through. The disc 42 provides axial location of the outer ring of the ball bearing 28 between a shoulder of the second mass 14 and the inner periphery of the disc 42, which is formed with a central hole, as is the disc 34.

It will be recalled that, during operation of the damped flywheel, the springs are caused to be compressed between the arms 50 of the disc 42 and the assembly consisting of the thrust inserts 81 of the plate 20 and the pressed-out portions 80 of the disc 34 of the first mass 12.

In the course of this movement, the heads 68 of the rivets 66 cause the ring 60 to rotate, thus giving rise to friction between the ring 60 and the plate 20.

A further friction effect is produced between the ring 60 and the ring 62, which is mounted on the first mass, for rotation with the latter, by means of a coupling of the tenon and mortice type.

For this purpose, the ring 62 has at its inner periphery lugs 73 which are engaged in complementary grooves 72 formed in the hub 18.

In this way, a friction effect occurs due to the force applied by the resilient ring 64. The disc 34 does of course have a central hole, and it lies radially outside the rivets 44, 66.

It will be noted that the plate 26 (and therefore the second mass 14) has at its inner periphery a plurality of ventilation holes 4, or ventilation passages 4, which are arranged to ventilate the damped flywheel. These holes 4 extend through the reaction plate 26.

Air is thus able to flow between the two plates 20 and 26. This ventilation enhances cooling of the ball bearing 28, the holes being located close to the ball bearing 28. These holes 4 are arranged alternately with the rivets 66 and 44, being located generally on the same pitch circle as the rivets 44 (FIG. 2).

In accordance with the invention, these holes 4 are open in the base of a groove 5 which is formed in the reaction plate 26 at its inner periphery, radially outwardly of the bearing 28, with the said holes interrupting the edge of the base of the groove 5. This groove 5 is adapted to collect oil which escapes from the centre of the damped flywheel, and in particular from the friction disc 100, so as not to contaminate the friction liners 101 of the said friction disc. The groove 5, which is of annular form, has a rounded profile in cross section (FIG. 1). The groove 5 is flared in the inward radial direction towards the axis X—X.

The holes 4 therefore have a double function, namely a ventilation function and a collecting function for the oil which may for example arise from oil leaks that take place in the region of the gearbox, with the said oil passing in particular through the hub mounted in rotation on the input shaft of the gearbox, the said hub being part of the friction disc.

Another case may be where the oil leaks come from the crankshaft via the hub 18 which is axially behind the groove 5 (FIG. 1). In a further case, the leaks may be those of grease from the ball bearing 28.

Thus the oil or grease is thrown centrifugally into the groove 5, and is evacuated via the ventilation holes 4. The friction surface offered by the plate 26 to the appropriate friction liner of the friction disc runs no risk of being contaminated, the groove 5 being located radially inwardly of the working portion of the friction surface (i.e. inwardly of the friction liners 101 in FIG. 1). In this example, the holes 4 are open at the level of the sealing ring 56B, which is stepped so as to define a wall portion 90, which is inclined axially towards the reaction plate 26 (FIG. 1), between its inner radial edge by which it is fastened to the disc 42, and its external radial edge which bears on the disc 34. The wall portion 90 is located at mid-height of the ring 56B.

This inclined wall portion acts as a deflector and throws the oil and/or grease, coming from the ventilation hole 4 or ventilation passage 4, towards the reaction plate 26 between the disc 34 and the plate 26.

The inwardly wall portion 90 is located radially outwardly of the holes 4.

It will be noted that the ring 2, on which the heads of the fastening studs 1 bear, is secured independently to the hub 18 by means of "pop" rivets or dowels 3 force-fitted into the hub 18, and that the pasty or viscous agent is introduced at the outer periphery of the first mass before the housing chamber 30 is closed.

It will be noted that the holes 4 are located radially outwardly of the axially acting friction device 58 which, with the circumferentially acting resilient means 38, constitutes a coupling means acting between the two masses 12, 14, so as to couple the second mass 14, resiliently in this example, to the first mass 12.

In another version, the resilient means may be such as to act radially.

In a further version, the coupling means may be of the centrifugal type, as described in the document FR-A-1 598

557, and may comprise weights which are carried resiliently by the first mass and which are arranged to engage with a rim fixed to the second mass.

The present invention is of course not limited to the embodiment described.

In particular, the holes 4, which are of round form in FIGS. 1 to 3, may be oblong in the circumferential direction. These holes 4 may be flared towards the plate 20.

The sealing rings 56A, 56B may be coated, for example by powder coating, with a layer having a low coefficient of friction, such as "TEFLON", for contact with the plate 20 and the disc 34, and also in order to reduce wear.

For example, these rings 56A, 56B are given a "TEFLON" coating having a thickness of 10 to 50 microns, for example by spraygun application, with curing in an oven at temperatures of the order of 200 to 250 degrees.

In another version, another coating having a low coefficient of friction may be used. This enables the friction effects between the rings 56A, 56B, and those between the plate 20 and the disc 34, to be well controlled.

In general terms, in accordance with the invention the groove 5 collects a lubricating agent, such as oil, escaping from the centre of the damped flywheel.

This groove 5 may have a different profile, such as a profile of trapezoidal form with a flat base and two inclined lateral flanks, one of which is interrupted by the ventilation holes 4.

In general terms, the edge of the base of the groove 5 is interrupted by the ventilation holes or passages 4, and this groove is flared radially inwardly towards the axis of the assembly, in order to prevent the oil from contaminating the above mentioned friction surface which is offset axially with respect to the groove. Thus in FIG. 1, the groove 5 is delimited by a frusto-conical wall portion which is directed radially inwardly.

We claim:

1. A damped flywheel comprising: first and second coaxial masses (12, 14), the first mass being adapted to be coupled in rotation to a driving shaft, while the second mass, being adapted to be connected to a driven shaft, wherein the two masses (12, 14) are mounted coaxially through an interposed bearing (28), with coupling means (32, 58) being interposed so as to couple the second mass (14) to the first mass (12), the second mass (14) firstly constituting a reaction plate (26) of a friction clutch and offering a friction surface for this purpose, and, secondly, including ventilation holes (4) in the region of the bearing (28), and wherein the coupling means (32, 58) comprises a disc (42) fixed to the second mass (14) and located axially between the second mass (14) and the first mass (12) and carrying at least one sealing ring wherein the ventilation holes (4) are open into the base of a groove (5) which is formed in the second mass (14) at the inner periphery of the reaction plate (26) radially outwardly of the bearing (28), for collecting a lubricating agent escaping from the centre of the damped flywheel, and the edge of the base of the groove (5) is interrupted by the ventilation holes (4) and the sealing ring (56B) has a wall portion (90) which is inclined axially and constitutes a deflector for the lubricating agent.

2. A flywheel according to claim 1, wherein the sealing ring is coated with a layer having a low coefficient of friction.

3. A damped flywheel having an axis (x—x) comprising: first and second coaxial masses (12, 14), the first mass adapted to be coupled in rotation to a driving shaft while the second mass (14), is adapted to be connected to a driven shaft, wherein the two masses (12, 14) are mounted coaxially through an interposed bearing (28), with coupling means (32, 58) being interposed so as to couple the second mass (14) to the first mass (12), the second mass (14) firstly constituting a reaction plate (26) of a friction clutch and offering a friction surface, and, secondly, including ventilation holes (4) in the region of the bearing (28), and wherein the coupling means (32, 58) comprises a disc (42) fixed to the second mass (14) being located axially between the second mass (14) and the first mass (12) and carrying at least one sealing ring (58B) having an external and internal edge by which said sealing ring is fastened to the disc (42) wherein the ventilation holes (4) are open firstly at a level of the sealing ring (56B), and secondly, into the base of a groove (5) which is formed in the second mass (14) at the inner periphery of the reaction plate (26) radially outwardly of the bearing (28), for collecting a lubricating agent escaping from a center of the damped flywheel, and the edge of the base of the groove (5) is interrupted by the ventilation holes (4) and the sealing ring (56B) has between the inner radial edge and the external radial edge, a wall portion (90) which is inclined axially and constitutes a deflector for the lubricating agent.

4. A flywheel according to claim 3, wherein the wall portion (90) is located radially outwardly of the ventilating holes (4).

5. A flywheel according to claim, 4, wherein the groove is flared radially toward the axis.

* * * * *